Figure 1:
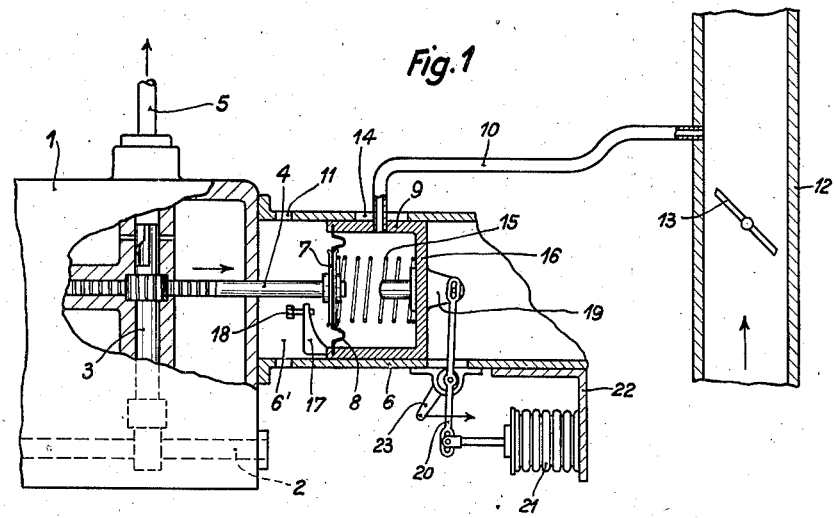

Feb. 25, 1941.　　　　A. SCHWEIZER ET AL　　　　2,233,035
DEVICE FOR REGULATING THE AMOUNT OF FUEL DELIVERED
TO INJECTION INTERNAL COMBUSTION ENGINES
Filed July 21, 1937　　　　2 Sheets-Sheet 1

Inventors
Alfred Schweizer
Max Hurst
by Roy F Steward
their attorney

Patented Feb. 25, 1941

2,233,035

UNITED STATES PATENT OFFICE 2,233,035

DEVICE FOR REGULATING THE AMOUNT OF FUEL DELIVERED TO INJECTION INTERNAL COMBUSTION ENGINES

Alfred Schweizer and Max Hurst, Stuttgart, Germany, assignors to Robert Bosch Gesellschaft mit beschränkter Haftung, Stuttgart, Germany Application July 21, 1937, Serial No. 154,868
In Germany July 10, 1936

9 Claims. (Cl. 123—140)

The present invention relates to devices for regulating the amount of fuel delivered to injection internal combustion engines which work at constant and also at sharply changing external air pressure. The device consists of a pneumatic regulator which actuates the member of the injection apparatus adjusting the amount delivered; the regulating member of this regulator is adjusted on one hand by the difference between the pneumatic pressure drop, which operates on the regulating member (between the atmospheric pressure and the pressure in the air supply pipe), and a return force which operates counter to the pressure drop in the whole range of speeds, and on the other hand by a barometer operating mechanism responsive to variations in atmospheric pressure. With changing external air pressure the adjustment of the pneumatic regulator alters, as does the weight of the quantity of air sucked in by the cylinders.

In its operation on the member of the pump adjusting the amount delivered, and consequently on the exact proportioning of the amount injected, the pneumatic regulator has functions to fulfil in which it may be supported, but not hindered, by the barometric regulation of the amount injected on alterations in atmospheric pressure. If the barometer were to be coupled with the pneumatic regulator and with the member of the pump adjusting the amount delivered in such a manner that, for instance, the adjustments of the barometer consequent on alterations in external air pressure, resulted in a certain alteration of the return force of the pneumatic regulator, then a return pressure would be exercised on the barometer box which would soon destroy it. By the present invention the barometer and the pneumatic regulator may be arranged in relation to the member of the injection pump adjusting the amount delivered, and the direct and indirect influence of the alterations in the atmospheric pressure on the pneumatic regulator may be balanced, while at the same time the internal forces of adjustment of the pneumatic regulator, which fulfil very definite regulating demands, remain uninfluenced by the barometric regulation; also, conversely, an adjustment of the pneumatic regulator does not, as a consequence, transmit its adjusting force to the barometer.

The invention lies in the fact that both the members which regulate the delivery amount of the injection pump, the barometer and the pneumatic regulator, operate on the member of the injection pump controlling the delivery amount through transmission means which are common to both members, and are subject to the play of the forces operating on both members, but which do not transmit to one member the forces operating on the other but only transmit said forces to the member of the injection pump adjusting the amount.

Figure 2:
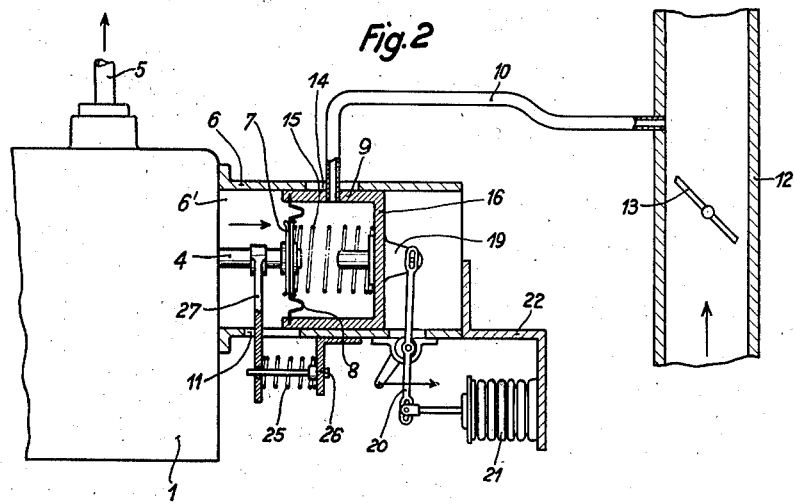
Figure 3:
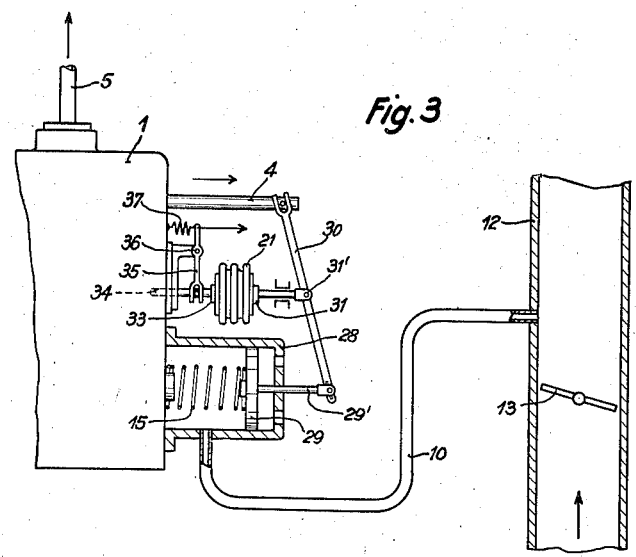
Figure 4:
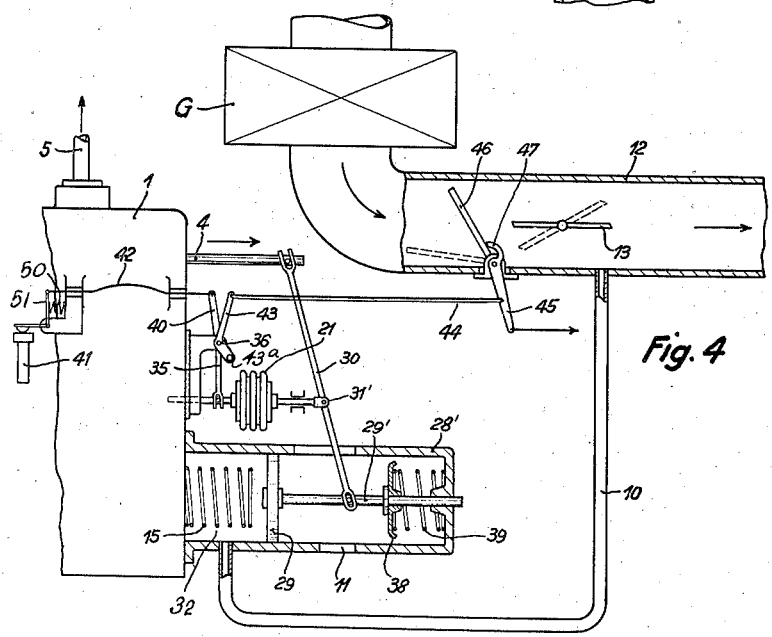

The invention is more particularly described with reference to the accompanying drawings in which several forms of construction are shown. In these drawings Fig. 1 shows in partial longitudinal section an injection pump having a built on regulator and also a member responsive to variations in atmospheric pressure. Fig. 2 is a similar view of a modified arrangement with a member limiting the adjustment of the regulator. Fig. 3 shows a further form of construction. Fig. 4 shows a still further example of construction.

In the drawings the casing of an injection pump is shown at 1, the cam shaft at 2 and the pump piston at 3. The pump pistons 3 are adjusted rotatably about their axes by means of a toothed control rod 4, whereby the position of an oblique control edge on each piston is altered in relation to the return opening to control the amount of fuel delivered to the engine by each piston. The fuel to be injected to a nozzle of the internal combustion machine (not shown) is delivered through a pipe 5. The control rod 4 projects into a casing 6 built on the injection pump; this casing is open at the end remote from the pump and its inner chamber 6' is in communication with atmosphere by openings 11. A hollow plunger 9 having a radial wall at one end and enclosing a regulating chamber is inserted in the casing 6; this sleeve is completely closed at its opposite end by a bent diaphragm 8 stretched between plates 7, the outer edge of the diaphragm being tightly secured to the plunger 9. The diaphragm is connected by the plates 7 with the free end of the control rod.

The plunger 9 is arranged in the guide casing 6, so as to be movable longitudinally of its axis, and as a closed unit is displaceable either with the control rod or relative to it. The inner chamber formed by the plunger is connected by a flexible pipe 10 with the space situated behind the throttle valve 13 in the induction pipe 12 of the engine. The flexible pipe 10 which is firmly connected with the plunger 9 passes through a slot 14 in the casing 6 is of sufficient length to enable it to stretch to the limiting position of the plunger remote from the induction pipe. One end of a return spring 15 abuts on the radial end 16 of the plunger 9, whilst the other end of the spring bears against the inner of the two plates 7 which are secured to the end of the control rod. The return spring 15 tends to push the control rod out of the chamber 6' and thereby to adjust the control rod in the direction of "full load".

On the left hand end of the sleeve 9 is mounted a bracket 17 which carries an adjustable stop 18 against which the outer of the two plates 7 impinges on reaching the position of full load.

On the outer face of the end wall of the plunger is mounted a boss 19 to which a lever 20 is connected, the pivot of which is seated on the casing. The other end of this lever is connected to the lid of a member 21 which is responsive to variations in atmospheric pressure in the manner of the operating mechanism of a barometer and which is attached by its bottom base to an arm 22 fixed to the casing 6. The pivotal axis of the lever 20 is adjustable by means of an eccentric lever 23 mounted on the casing 6. If the engine is operated at a small unchanging height above sea level, the pneumatic regulator works in known manner with alterations in load; the sleeve 9 does not alter its position in the casing 6. The control rod is adjusted to correspond with the pressure prevailing in the regulating chamber, the extent of which is dependent on the speed of the machine and the position of the throttle valve 13 in the induction pipe 12. Under these conditions when the control rod is adjusted the control chamber is maintained in its position by the variable pressure member 21.

If the engine is required to operate at higher altitudes the member 21 expands as atmospheric air pressure sinks. In such event the plunger 9 moves to the right together with the parts connected with it, the control rod being also displaced a similar distance to the right. On the pneumatic regulator itself no alteration takes place, since the member 21 has no influence on the pressure and force conditions in the interior of the regulating chamber. Owing to this movement of the control rod in the direction of "stop", the amount of fuel delivered to the engine is diminished by an amount corresponding to the weight of the air drawn in.

Should the engine when the machine is climbing, be adjusted to high performance by opening the throttle valve, a lower depression occurs in the induction pipe and in the chamber 9 as a result of the small throttling still present. Accordingly the return spring 15 expands considerably and tends to adjust the control rod to the maximum delivery quantity of the injection pump. With increasing height of climb, the pressure in the chamber 6' and in the control chamber diminishes further. These pressures however diminish by differing amounts and in fact the unthrottled external air pressure in the chamber 6' will decrease somewhat more rapidly than the pressure in the chamber within the plunger 9, so that the pressure drop of the pneumatic regulator diminishes continually with increasing height of climb. This decrease however is small, since only a small depression is available in the interior of the chamber 9 and the displacement force of the return spring is weakened. Nevertheless the return spring can still displace the control rod by a small amount corresponding to the lessening of the pressure drop, that is towards the "full" position, in addition to the amount by which it has already displaced the control rod following the opening of the throttle valve. During a climb under load at great altitudes, there occurs through the atmospheric pressure a double correction of the adjustment of the control rod which stands at the "full" position; that is to say, there occurs through the member 21 a powerful movement towards the "stop" position whilst as a result of the lowering of the pressure drop this powerful movement is opposed by a weak displacement towards the "full" position on the pneumatic regulator. This correction corresponds roughly to actual conditions in as far as at equal absolute pressure in the suction pipe at different heights, a somewhat larger quantity of fuel, which the pneumatic regulator automatically adjusts, must be injected as a result of the small counter pressure of the exhaust and the better air fitting connected with it.

In the example illustrated in Fig. 2 a spring 25 is arranged on the guide casing 6 for the movable chamber 9; one end of this spring abuts against a lug 26 of the casing 6. The other end of the spring bears against a holder 27 which is attached to the control rod 4 and is moved to and fro with it when the control rod under partial load or no load has been drawn to the right due to considerable drop in pressure and also when the control rod with the whole chamber as a unit is moved still further to the right in the direction of the "stop" position as a result of low atmospheric pressure, while the machine climbs to a considerable altitude. In this period the tension of the spring 25 limits increasingly the adjusting force of the member 21 so that this cannot produce a decrease of the amount injected which is too large or which exceeds the set amount.

The construction according to Fig. 3 differs from those of Figs. 1 and 2 in that the member 21 is arranged between the pneumatic regulator and the control rod. The casing 28 of the pneumatic regulator is secured to the injection pump and its plunger 29 is pivotally connected through the piston rod 29' with one end of a lever 30, the other end of which is pivotally connected to the free end of the control rod 4. The lid 31 of the member 21 is pivotally connected with the displacement lever 30. By means of the flexible pipe 10 the control chamber which is closed externally by the plunger, is in communication with the induction pipe 12 at a part in rear of the throttle valve 13. With unaltering atmospheric pressure the point of connection 31' of the lever 30 with the member 21 does not move. With alterations of the depression in the induction pipe the control plunger 29 is moved to and fro and its movement is transmitted by the lever 30 to the control rod 4. In this case only the small friction forces occurring with movement of the control rod must be overcome. If the atmospheric pressure alters, the point of connection 31' is displaced and the lever then causes at the same time a displacement of the control rod. In both cases the adjusting forces of the pneumatic regulator do not operate on the member 21 and vice versa so that the control operates almost without return pressure.

As Fig. 3 shows, the base 33 of the member 21 is mounted movably on the casing 1 of the injection pump by means of a pin 34. The bifurcated end of a lever 35 engages the pin 34, and is rotatably mounted on a pivot 36 carried by the casing 1 and is tensioned by a spring 37. By means of the lever 35 the member 21 can be moved bodily to and fro through its adjusting device so that the lever 30 is turned and the control rod alters its position relative to the pneumatic regulator. By means of this device the amount of fuel injected can be adjusted independently from the pressure conditions temporarily prevailing on the member 21 or in the pneumatic regulator.

The example of construction in Fig. 4 shows a regulating device in which the chamber of the pneumatic regulator behind the throttle 13 is connected to the air inlet 12 of an injection internal combustion engine working with a compressor or blower G shown diagrammatically. The lower end of the lever 30 through which the member 21 and the movable control piston of the pneumatic regulator adjust a control rod 4, is led into the casing 28' of the pneumatic regulator and connected to the piston rod 29'. On the piston rod 29' a support 38 for a return spring 39 is secured which abuts against the cover of the casing 28' in which the piston rod 29' is mounted. In the position drawn the return spring 15 no longer bears on the piston 29 and only the spring 39 working in opposed relationship to the spring 15 operates on this piston. This spring 39 tends to displace it to the left against the absolute pressure operating in the control chamber 32.

On the shaft 36, which according to Fig. 3 is provided for displacing the member 21, a lever 40 is secured which is moved by a thermostat 41 through the medium of a Bowden wire 42, said thermostat being mounted in any desired location adjacent the fuel pump so as to be sensitive to changes in atmospheric temperature. With alterations of the atmospheric temperature the thermostat can displace the member 21 through the Bowden wire and correct the position of the control rod by means of the lever 30. When no change in temperature occurs, thermostat 41, Bowden wire 42 and lever 40 form, in effect, a fixed stop for the left hand end of the membrane 21, so that when changes in atmospheric pressure occur, the membrane capsule 21, by means of its movable right hand end, can displace lever 30 and control rod 4. It will be obvious that thermostat 41 and membrane capsule 21 can also work simultaneously.

On the shaft 36 is mounted a further lever 43, which is adjustable independently of the lever 40, and which is connected by means of a rod 44 to an adjustment lever 45, adapted to be set by the driver of the engine, for a control member or pivoted vane 46, rotatably disposed or pivotally mounted in the induction pipe of the engine. This control member or valve 46 is arranged between the compressor or blower and the throttle 13 in the induction pipe and is pressed against or loosely connected with a boss or abutment member 47 carried by lever 45, by the load pressure or flow of air in air inlet 12. Control member 46 thus constitutes a regulating device or pivoted vane by which the flow of air under pressure from the compressor or blower G can be controlled or regulated. Ordinarily the vane 46 is maintained in the position shown in full lines in Fig. 4, but if the engine is to be excessively accelerated for starting and maximum power is desired, lever 45 and boss 47 will be rotated or moved by hand in the direction of the arrow in Fig. 4 to move the vane 46 to the fully open position shown in dotted lines. When the lever 45 is moved to the right in the direction of the arrow, a clockwise rotation is transmitted by rod 44 to lever 43, which turns lever 35 clockwise by means of the stop or abutment member 43ᵃ. This right hand movement of lever 45, with consequent movement of lever arms 40 and 43 to the right and lever arm 35 to the left to cause an increase in the delivery of fuel, takes place against the tension of a comparatively stiff spring 50, which yields to permit this movement and which, under normal working conditions of the thermostat 41 and membrane 21, presses the bell crank lever 51 connected with the Bowden wire 42 against the top of the thermostat. The spring 50 has such a high pretension that, except when moved as just explained, it acts as a stop to permit relative movement of the right hand end of membrane 21 to move lever 30 and control rod 4. When the vane 46 is in the position shown in dotted lines in Fig. 4, the blower G can produce a high air pressure in the induction pipe as well as in the line 10 and in the governor chamber at the left hand side of the movable piston 29 and under the influence of such high air pressure said piston will move toward the right and adjust an excess fuel delivery of the injection pump by displacing the control rod 4 accordingly.

When the aeroplane reaches higher altitudes and the air pressure sinks, the blower will deliver smaller quantities of air to the induction pipe and the vane 46 can be adjusted to compensate for this.

If a pressure prevails in the control chamber which is lower than the external air pressure, the pressure drop between these two pressures is utilised to displace the control piston 29 against the strength of the return spring 15 to the left in the sense of diminishing the quantity of fuel injected. Consequently the second return spring 39 is expanded and no longer bears on the plate 38. If an equal or approximately equal pressure prevails on both sides of the control piston, the piston is in a position in which both the return springs operate on it.

As soon as the load pressure present in the control chamber is greater than the external air pressure it displaces the control piston so far to the right that the return spring 15 ceases to operate and only the return spring 39 controls or acts on the plate 38. Corresponding to smaller deviations of the overload pressure from the external air pressure, the return spring 39 in so far as its loading action is concerned becomes weaker than the return spring 15, which operates on depression in the induction pipe. The load pressure in the control chamber, from the moment when the spring 39 only operates against it, should be such as to further displace the control rod through the control piston in the direction of increasing the amount of fuel upon an increase in the load pressure, and so that upon a still further increase of the load pressure, it will produce a considerable further increase in the quantity of fuel delivered per piston stroke.

We declare that what we claim is:

1. Apparatus for controlling the amount of fuel supplied to internal combustion engines having an induction pipe and which operate at constant and also sharply changing atmospheric pressures, comprising fuel controlling means for varying the amount of fuel supplied to said engine, a device sensitive to variations in pressure in said induction pipe, a device sensitive to variations in atmospheric temperature, a device sensitive to variations in atmospheric pressure, and mechanism operatively connecting said devices to said fuel controlling means whereby said means is automatically controlled and actuated jointly by said devices.

2. Apparatus for controlling the amount of fuel supplied to internal combustion engines operating at constant and also sharply changing atmospheric pressures and having an induction pipe, a throttle valve therein and means for supplying air under pressure to said induction pipe, comprising a fuel controlling member for varying the amount of fuel supplied to said engine, a device sensitive to variations in pressure in said induction pipe between said throttle valve and said engine, a device sensitive to variations in atmospheric temperature, a device sensitive to variations in atmospheric pressure, and mechanism operatively connecting said devices to said fuel controlling member whereby said member is automatically controlled and actuated jointly by said devices.

3. Apparatus for controlling the amount of fuel supplied to internal combustion engines operating at constant and also sharply changing atmospheric pressures and having an induction pipe, a throttle valve therein and means for supplying air under pressure to said induction pipe, comprising a fuel controlling member for varying the amount of fuel supplied to said engine, a device sensitive to variations in pressure in said induction pipe between said throttle valve and said engine, a device sensitive to variations in atmospheric temperature, a device sensitive to variations in atmospheric pressure, mechanism operatively connecting said devices to said fuel controlling member whereby said member is automatically controlled and actuated jointly by said devices, and manual means for moving a portion of said mechanism and causing it to actuate said fuel controlling member.

4. Apparatus for controlling the amount of fuel supplied to internal combustion engines having an induction pipe and operable at varying altitudes, comprising a fuel controlling member for varying the amount of fuel fed to said engine, a device responsive to pressure in said induction pipe, a lever pivotally connected at one end to said induction pressure responsive device and at the other end to said controlling member, a thermostat pivotally connected to said lever intermediate its ends and acting on said lever and said fuel controlling member to compensate for the effect of variations in air temperature, and an atmospheric pressure responsive device pivotally connected to said lever intermediate its ends and acting on said lever and said fuel controlling member to compensate for variations in atmospheric pressure.

5. The combination, with an internal combustion engine of the liquid fuel injection type having an induction pipe, means for supplying air under pressure to said induction pipe and a throttle valve in said induction pipe between the engine and said air-pressure-supplying means, of a fuel supply system and control means therefor adapted to control the speed of the engine according to the position of said throttle valve; said fuel supply system and control means therefor comprising a fuel injection pump driven by said engine, a displaceable control member, means mounting said control member for movement in opposite directions, said control member being movable in opposite directions by differences in fluid pressure on its opposite faces, means exposing one face of said control member to atmosphere and its opposite face to the pressure, varying from sub-atmospheric to super-atmospheric, in said induction pipe on the engine side of said throttle valve, means operated by said control member to control the rate of fuel delivery of said pump in accordance with the displacement of said control member, resilient means applying a resisting force to said control member to resist movement thereof in one direction in response to the effect of pressures less than atmospheric exerted thereon, and opposed resilient means applying a resisting force to said control member to resist movement thereof in the opposite direction in response to the effect of pressures greater than atmospheric exerted thereon.

6. The combination as set out in claim 5 including a thermostat connected to said fuel delivery controlling means and acting thereon to compensate for variations in air temperature, and an atmospheric pressure responsive device connected to said fuel controlling means and acting thereon to compensate for variations in atmospheric pressure.

7. The combination as set out in claim 5 including a valve in said induction pipe between said air-pressure-supplying means and said throttle valve whereby the flow of air under pressure from said air-pressure-supplying means can be controlled, a thermostat connected to said fuel delivery controlling means and acting thereon to compensate for variations in air temperature, and an atmospheric pressure responsive device connected to said fuel delivery controlling means and acting thereon to compensate for variations in atmospheric pressure.

8. Apparatus for controlling the amount of fuel supplied to an internal combustion engine having an induction pipe and a throttle valve within said induction pipe, comprising, in combination, a pneumatic governor having two governor chambers separated one from the other by a movable control member, a pipe connecting one of said governor chambers with the induction pipe at a point between the throttle valve and the engine, the other governor chamber being connected with atmosphere, a double armed lever, said control member being pivotally connected to one end of said double armed lever, a fuel injection pump fuel delivery control means for said injection pump, said delivery control means being pivotally connected with the other end of said double armed lever, and barometric means pivotally connected to an intermediate point of said double armed lever and providing a movable fulcrum point therefor controlled by said barometric means.

9. Apparatus as set out in claim 7 including spring tensioned means for normally supporting said barometric means against movement but permitting movement thereof against the tension of said spring, and manual means for moving said spring tensioned means against the tension of said spring.

ALFRED SCHWEIZER.
MAX HURST.